Jan. 26, 1971    J. K. PEASE ET AL    3,557,594
METHOD OF MAKING A TRUNCATED CONICAL BODY
Filed Nov. 20, 1968    2 Sheets-Sheet 1

Inventors
James K. Pease
Ralph A. Keidel
Kattar U. Rao
By Robert C. Sullivan
Attorney

United States Patent Office 3,557,594
Patented Jan. 26, 1971

3,557,594
METHOD OF MAKING A TRUNCATED CONICAL BODY
James K. Pease, Milwaukee, Ralph A. Keidel, West Allis, and Kattar U. Rao, Milwaukee, Wis., assignors to Allis-Chalmers Manufacturing Company, Milwaukee, Wis.
Filed Nov. 20, 1968, Ser. No. 777,251
Int. Cl. B21b *1/00;* B21d *9/08;* B21c *37/02*
U.S. Cl. 72—203                               7 Claims

ABSTRACT OF THE DISCLOSURE

A method of making a truncated conical body such as a head for grinding mills or the like, in which the truncated conical body is fabricated of a plurality of truncated conical sectors welded to each other. Each truncated conical sector is formed from an initially flat piece of rolled steel plate cut into the developed shape of the conical sector and subsequently bent into the shape of a truncated conical sector while being mounted during the bending operation for swiveling movement about a point coincident with the projected apex of the truncated cone. A hollow trunnion is welded to the outer surfaces of the fabricated truncated cone.

BACKGROUND OF THE INVENTION

Field of the invention

This invention relates to a method of making truncated conical bodies such as heads for grinding mills or the like.

Description of the prior art

For many years, mill heads, such as grinding mill heads or the like, were made as steel castings in one piece per head. As the size of the mill head increased, the problems arising in obtaining a sound casting became greater to the point where it became difficult to obtain a quality casting for use as a mill head. More particularly, due to the configuration of the casting, it became difficult to obtain a sound crackfree and shrinkfree casting in the high stress zone at the junction of the head to the trunnion. The criticality of the mill head and the attached trunnion as a component of the grinding mill becomes apparent when it is realized that the two opposite mill heads and attached trunnions must carry the entire load of the mill, including the ball charge, which in larger mills can be as much as a million pounds per bearing.

The use of rolled steel plate for the mill head, instead of the prior art steel castings is advantageous since the rolled steel plate can be checked for quality before it is fabricated into the head. Furthermore, the quality of rolled steel plate is much better and more predictable than the quality of a steel casting. Therefore, the size of the fabricated head does not affect the quality of the mill head as does a steel casting.

SUMMARY OF THE INVENTION

Accordingly, it is an object of this invention to provide a method of making a fabricated truncated conical body such as a head for a grinding mill or the like in which the body is formed of sectors of a truncated cone welded together to form a body of truncated conical shape.

It is another object of the invention to provide a method of making a mill head formed of rolled steel plate which is more reliable and of higher quality than the cast mill heads of the prior art.

It is another object of the invention to provide a method of making a mill head for grinding mills or the like which can be formed of rolled steel plate which is of better and more accurately predictable quality than the quality of steel castings of which mill heads of the prior art have been manufactured.

It is another object of the invention to provide a method of making a mill head formed of rolled steel plate in which the size of the fabricated head does not affect the quality of the head as it does in the case where a steel casting is used to form the head.

It is another object of the invention to provide an improved method of manufacturing a truncated conical body such as a mill head for a grinding mill or the like, in which the truncated conical body can be formed with a higher degree of accuracy than in accordance with methods of the prior art.

In achievement of these objectives, there is provided in accordance with this invention a method of making a truncated conical body such as a head for grinding mills or the like in which the truncated conical body is fabricated of a plurality of truncated conical sectors welded to each other and in which each truncated conical sector is formed from an initially flat piece of rolled steel plate cut into the developed shape of the conical sector and subsequently bent into the shape of a truncated conical sector. An important feature of the method is that during the entire bending operation on the sector, the sector is swivelly mounted on a modified universal joint located at the projected apex of the truncated cone of which the sector forms a part. A hollow trunnion formed of steel plate rolled into cylindrical shape is welded to the outer surface of the fabricated truncated cone when the truncated cone is used in a grinding mill.

BRIEF DESCRIPTION OF THE DRAWINGS

Further objects and advantages of the invention will become apparent from the following description taken in conjunction with the accompanying drawings in which.

DESCRIPTION OF THE PREFERRED EMBODIMENT

Figure 1:
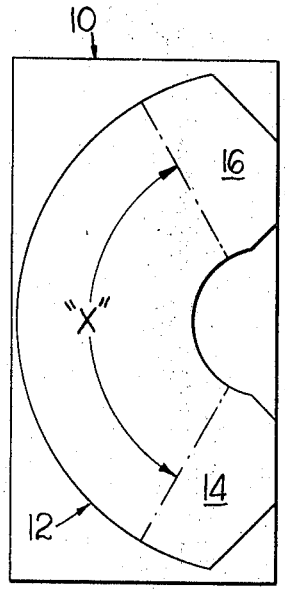
FIG. 1 is a view of a rolled steel plate having outlined thereon the developed form in a horizontal plane of one of the truncated conical sectors which is joined to other similar truncated conical sectors to form the truncated conical body such as a fabricated mill head.

Referring now to FIG. 1, there is shown a flat plate generally indicated at 10 formed of rolled steel and having marked thereon a piece generally indicated at 12 which is the developed shape in a horizontal plane of a sector X of a truncated cone plus an additional excess portion 14 or 16 at each end thereof.

Figure 6:
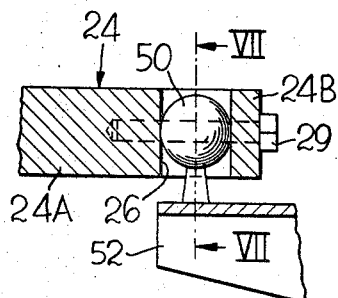
FIG. 6 is an enlarged view in cross-section taken along line VI—VI of FIG. 2, of the "ball-and-cylinder" joint on which the workpiece is mounted for movement.
Figure 7:
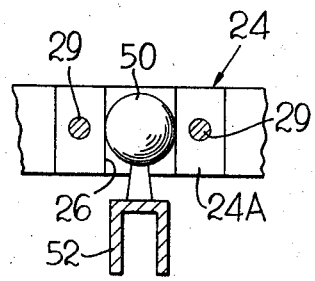
FIG. 7 is an enlarged view in cross-section taken along line VII—VII of FIG. 6 of the ball-and-cylinder joint.

For the purposes of the specification and claims of this application, a "truncated cone" is hereby defined as a cone section lacking an apex. The sector X is ultimately joined with two other similar sectors to form the truncated conical head shown in FIG. 8. The excess end portions 14 and 16 facilitate the metal bending operation and are ultimately removed by cutting before the sector X is joined to other similar sectors to form the final truncated-cone-shaped head member of FIG. 8. The outline of the piece 12 is positioned on the rolled steel plate 10 by means of a template or the like and the piece 12 is then cut by any suitable means from the steel plate 10 to produce the cut developed piece 12 seen in FIG. 2. To facilitate handling of piece 12, looplike handle portions 18 are rigidly attached, as by welding, to the outer ends of the opposite end portions 14 and 16 thereof. The sector X of piece 12 has a radially inner periphery indicated at 20 and a radially outer periphery indicated at 22. Both the radially inner periphery 20 and the radially outer periphery 22 are arcs whose center is located at the projected apex of the truncated cone of which the sector forms a part. A pivot arm member 24 is rigidly secured as by welding or the like to the midpoint of the radially inner periphery 20 of piece 12. As best seen in the view of FIG. 6, the radially inner end portion of arm 24 is provided with a cylindrical passage 26 therethrough which cooperates with a stationary ball 50 to define what might be described as a modified universal joint lying at the projected apex of the truncated cone and permitting a modified universal swiveling movement of piece 12 during the metal bending operation to be described hereinafter.

To facilitate assembly of the cylinder 26 and ball 50 relative to each other, the arm 24 has a detachable outer end portion 24B which is secured to the main portion 24A of arm 24 by bolts 29. A portion such as 180 degrees of the cylindrical opening lies in each of the cooperating parts 24A and 24B. The use of the detachable end portion 24B permits the ball 50 to be first placed in position relative to arm portion 24A with the end portion 24B then being bolted in position.

The ball member 50 which cooperates with the cylindrical passage 26 of arm 24 is mounted in upstanding relation on a horizontal bracket arm 52 mounted on the upper end of a vertically adjustable support 54 which carries at its lower end a piston 56 operable in a hydraulic cylinder 58. Hydraulic cylinder 58 is mounted on a stationary part of the support structure. Hydraulic fluid may be admitted to cylinder 58 to properly adjust the height of support 54 and hence of ball 50. The vertical height of the ball 50 remains fixed for all metal bending operations, although it may be necessary to move bracket arm 52 and support 54 for reasons not connected with the height adjustment.

The swivel connection 50, 26 of piece 12 is located at the projected apex of the truncated cone of which the portion X of piece 12 will form a part.

The ball-and-cylinder connection of arm 24 as just described permits what might be described as a "modified universal movement" of arm 24 and hence of workpiece 12. The ball-and-cylinder connection of arm 24 permits the arm 24, and hence workpiece 12, to rock in three dimensions relative to the spherical surface of ball 50, and also permits arm 24, and hence workpiece 12, to move in a plane perpendicular to the plane of the arm 24. The movements at the ball-and-cylinder connection as just described thereby accommodate to any necessary movements of the workpiece during the metal bending operation.

Figure 2:
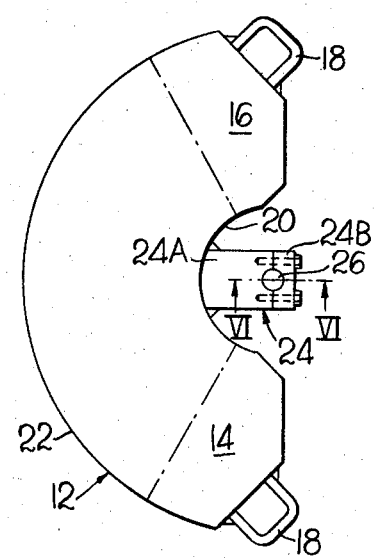
FIG. 2 is a plan view of the developed sector of FIG. 1 having a pivoting arm mounted thereon and also having handles mounted thereon for use during the truncated cone sector forming process.
Figure 3:
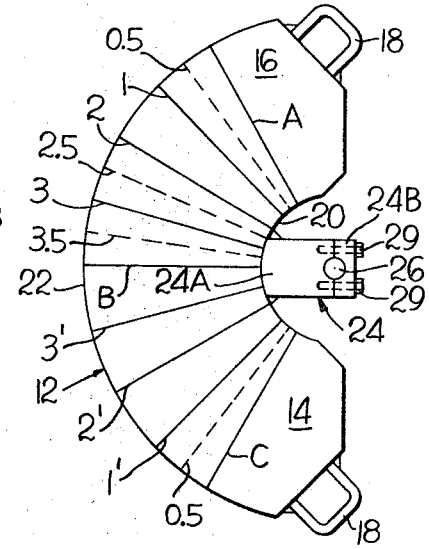
FIG. 3 is a view of the developed truncated cone sector of FIGS. 1 and 2 having bend lines temporarily drawn thereon for use during the truncated cone sector forming process.

As seen in FIG. 3, the piece 12 of FIG. 2 has marked thereon a number of "guide lines" such as those indicated at A, 0.5, 1, 2, 2.5, 3, 3.5, B, 3', 2', 1', 0.5' and C. All of these guide lines lie on radii whose center lies at the projected apex of the truncated cone. As will be described hereinafter more fully, these lines are "bend lines" with respect to which the upper and lower rolls of the bending apparatus are symmetrically positioned during the bending operation on piece 12, whereby the piece 12, and particularly the sector X thereof is bent along radii whose center is located at the projected apex of the truncated cone. It should be understood that the particular guide lines shown are by way of example only.

Figure 4:
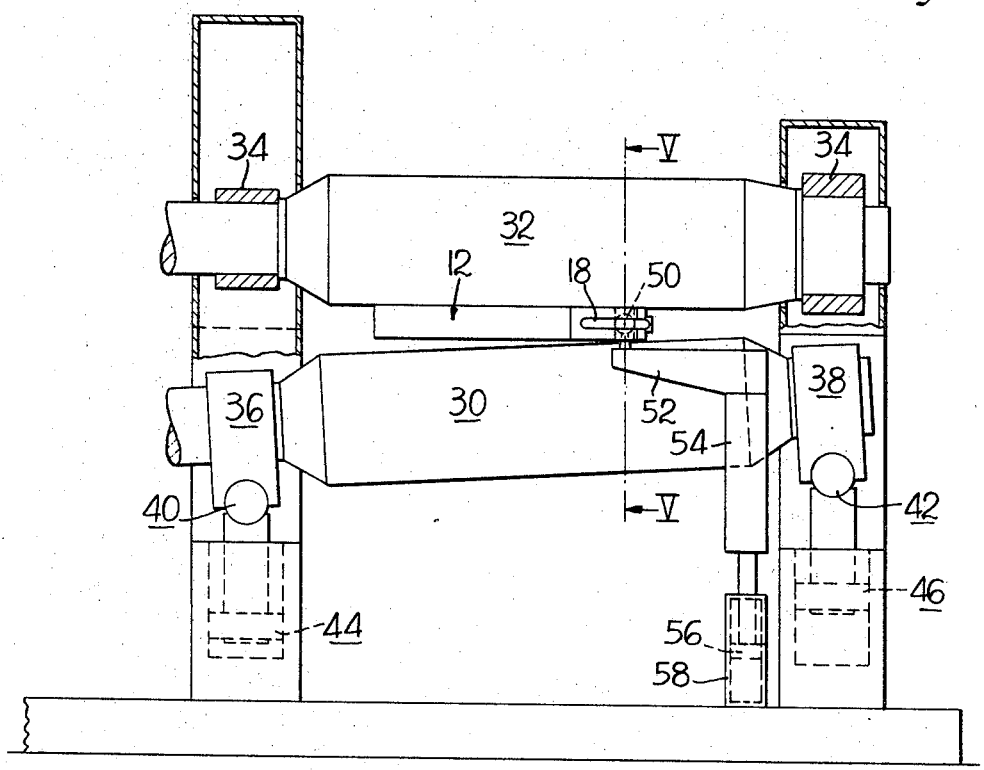
FIG. 4 is a view of the developed truncated cone sector of FIGS. 1-3 in position between the upper and lower bending rolls which bend the developed sector to its proper contour.
Figure 5:
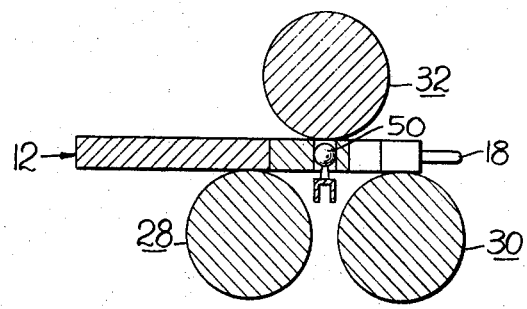
FIG. 5 is a view in section along line V—V of FIG. 4, with the workpiece rotated 60 degrees in a counterclockwise direction with respect to the view of FIG. 3, with the bend line A of FIG. 3 lying directly beneath and parallel to the longitudinal axis of upper roll 32.

Referring now to FIGS. 4 and 5, there is shown an apparatus which may be used to bend the plate 12 of FIGS. 2 and 3, which lies initially in a flat horizontal plane, so that the portion X is bent into a sector of a truncated cone which when assembled with two other such sectors, in the illustrated embodiment, forms a body, such as a mill head, of truncated conical shape.

Referring to FIGS. 4 and 5, there is shown an apparatus including a pair of laterally spaced lower roll members 28 and 30, respectively, and a single upper roll member 32. The two lower rolls 28 and 30 and the upper roll 32 all have their respective longitudinal axes lying in vertical planes which are parallel to each other. The longitudinal axes of the two lower rolls 28 and 30 are symmetrically positioned beneath and on opposite sides of the longitudinal axis of upper roll 32. Thus, when the two lower rolls 28 and 30 are moved upwardly toward the upper roll 32 as will be explained hereinafter, an interposed workpiece 12 is bent upwardly about the upper roll 32 by the two lower rolls 28 and 30. The upper roll member 32 is supported at the opposite ends thereof by fixed bearing members each indicated at 34, whereby the roll 32 always lies for its entire length in a horizontal plane. The two lower roll members 28 and 30, in contrast, are each respectively mounted in opposite bearing members 36 and 38, which may be independently vertically adjusted so as to cause the rolls 28 and 30 to lie with the longitudinal axes thereof in a tilted relation with respect to the horizontal plane, as best seen in the view of FIG. 4. It can be seen that each of the bearings 36 and 38 is supported at the respective lower ends thereof by a support member of cylindrical shape respectively indicated at 40 and 42. The respective cylindrical supports 40 and 42 are mounted at the upper end of hydraulic pistons 44 and 46, respectively. While the view of FIG. 4 shows only the bearings and height or tilt adjusting mechanism for lower roll 30, it will be understood that the other lower roll 28 is similarly supported and may similarly have its height and tilt adjusted in the same manner as roll 30.

As seen in the view of FIG. 4, the end of each of the respective rolls 28 and 30 nearest the projected apex of the truncated cone, which is the right-hand end of rolls 28 and 30 with respect to the view of FIG. 4, is raised higher than the opposite or left-hand end (with respect to the view of FIG. 4) of the respective rolls by raising the corresponding hydraulic piston 46 of each roll 28 and 30 higher than the hydraulic piston 44. The bearings 36 and 38 will swivel relative to their respective cylindrical supports 40 and 42 to adjust to the titlted position. Suitable drive means, not shown, is provdied for driving the rolls 28, 30 and 32 in either a forward or a reverse direction.

The rolls 28, 30, 32 and the associated operating mechanism therefore may be of the type DWVH manufactured by the Wilhelmsburger Maschinenfabrik, Hinrichs & Sohn, Geesthacht, near Hamburg, Germany.

In forming the conical section X from a flat rolled steel plate in accordance with the method of invention, the following procedure is followed:

First, the developed shape in a horizontal plane of the conical segment is outlined onto a flat rolled steel plate 10 as seen in FIG. 1. This outline can be placed on the flat rolled steel plate 10 by a template or the like, and will appear substantially as seen in FIG. 1 of the drawings. The portion indicated by X in FIG. 1 is the actual developed form of a truncated conical sector in a typical embodiment, with the end portions 14 and 16 being the excess portions which are subsequently removed at the end of the bending operation.

The outlined piece 12 including the X portion and the end portions 14 and 16 is then cut out by any suitable means from the rolled steel plate 10 to produce the shape shown in FIG. 2. The end handle portions 18 are then attached by welding or the like to facilitate handling of the piece 12, and the pivot arm 24 is attached, as by welding, to the midpoint of the inner periphery 20 of the piece 12. The bend lines A, 0.5, 1, 2, 2.5, 3, 3.5, B, 3', 2', 1', 0.5' and C, all radiating from the apex of the truncated cone as a center, are then suitably marked on the still flat and unbent plate 12 to define bend lines to be used in the bending operation.

The two vertically adjustable rolls 28 and 30 (FIGS. 4 and 5) are then lowered away from the upper roll 32 to permit the plate 12 to be positioned between the upper and lower rolls with the cylindrical passage 26 of arm 24 being positioned upon the ball 50 mounted on bracket 52, the bracket 52 having been previously adjusted to the proper vertical height to support the ball-and-cylinder connection between the arm 24 and the ball 50 at the proper height.

With the piece 12 mounted as just described, and lying between the upper roll 32 and the lower rolls 28 and 30, and with the lower rolls 28 and 30 having their respective forward bearings 38 elevated above their opposite bearings 36 by a sufficient distance to provide the tilt angle of the rolls 28 and 30 required to provide the predetermined conical angle for the truncated conical sector which is to be bent, the two lower rolls 28 and 30 are moved upwardly while maintaining a constant tilt angle, and while maintaining a constantly equal tilt angle on both lower rolls 28 and 30.

In bending the piece 12 it is preferred to start in one of the end regions first, and then to bend the opposite end region, and finally to bend the middle region of the piece 12.

For example, in initiating the bending operation, the piece 12 may be pivotally moved about its ball and cylinder connection to the position in which the line A lies in a common vertical plane with the longitudinal axis of upper roll 32, and is symmetrically positioned relative to the two lower rolls 28 and 30. The two lower rolls 28 and 30, with their tilt already adjusted to the required tilt angle, are then moved upwardly while both maintaining the same constant tilt angle, and bend the piece 12 upwardly about the upper roll 32 along the bend line A. During this upward bending operation obtained by the upward movement of the rolls 28 and 30, none of the rolls 28, 30 or 32 is rotated. All rolls remains in a non-rotating position. After bending the piece 12 along the line A, the lower rolls 28 and 30 are lowered sufficiently to permit the plate 12 to be pivotally moved by rotation of rolls 28 and 30 to a position in which line 1 on piece 12 is symmetrically positioned with respect to the rolls in the same manner as line A had previously been positioned during the first bending operation. When the plate has been moved to the second bending postion just mentioned, rotation of rolls 28 and 30 is stopped and rolls 28 and 30 are again raised at a constant tilt angle to bend the plate along the bend line 1. Upper roll 32 is never rotated in practicing this method. In a similar manner, the bending operation is repeated for bend lines 2, 3 and B. After bending along lines A, 1, 2, 3 and B, as just described, the plate is swiveled back for second pass, but is not swiveled all the way back to line A but rather, for example, back to line 0.5, and the plate is bent along the lines 0.5, 1, 2, 3, and 3.5, for example.

The plate is again pivotally moved about the ball and cylinder connection for a third pass, but this time back to line 1, and on the third pass the plate is bent along, for example, the bend lines 1, 2 and 3. In other words, on the first pass the plate is bent along bend lines reaching from line A to line B; on the second pass, the plate is bent along bend lines reaching from line 0.5 to line 3.5; and on the third pass the plate is bent along lines 1, 2 and 3. Thus, in each pass, a progressively narrower zone or span is bent than in the previous pass, and furthermore on each pass the rolls 28 and 30 are elevated higher than on the previous pass toward the top roll 32, while maintaining the rolls 28 and 30 at a uniform tilt angle. Rolls 28 and 30 are maintained at a constant tilt angle throughout the entire bending operation on a given workpiece.

After bending plate 12 in the region of line A to line B in a plurality of passes as just described, the plate is then swiveled about its ball and cylinder connection to align the bend C in symmetrical relation with the rolls 28, 30 and 32, and the plate is bent along the bend line C in the manner previously described. The portion of the plate lying between the lines C and B is then bent in a plurality of successive passes in the same manner as previously described in connection with the bending of the portion of the plate from bend line A to bend line B to produce an equal bending in the region C–B as had previously been obtained in the bending operations on region A–B. Finally, the same bending operations are performed on what might be termed the middle region of the plate, as, for example, between the bend lines 3 and 3'. After the plate has been bent in the manner just described, it will then be in the shape of a conical sector ready to be assembled with respect to two other similar conical sectors, since in the illustrated embodiment, each conical sector is of 120 degree span.

After the completion of the bending of the conical sector, the piece 12 is removed from the bending apparatus and the arm 24 is removed from piece 12, and the excess end portions 14 and 16 with their attached handles 18 are removed by a cutting operation from the main body portion X of piece 12, since the body portion X is the actual truncated conical sector which is to be joined to the other sectors to form the final truncated cone shaped mill head.

Figure 8:
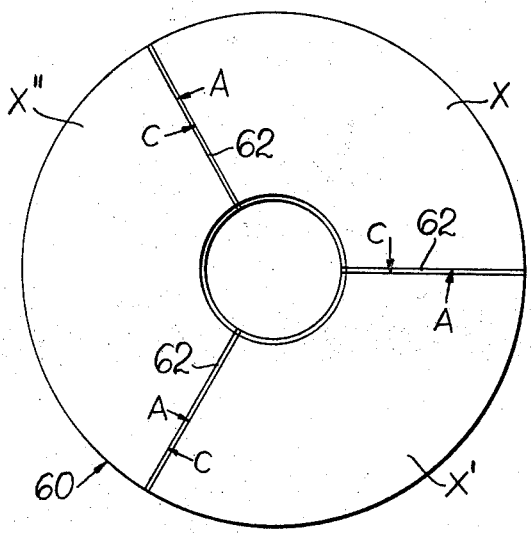
FIG. 8 is an end elevation view of a mill head formed of three truncated conical sectors welded together.

There is shown in FIG. 8 a view of an assembled truncated cone-shaped mill head generally indicated at 60 which is formed by joining three truncated conical sectors X, X', X'', each formed according to the method described in connection with FIGS. 1–5, inclusive. In the illustrated embodiment of FIG. 8, each truncated conical sector has a 120 degree span and the three truncated conical sectors are joined together by any suitable type of welds 62. However, it is obvious that the truncated cone could be fabricated from a different number of sectors than shown in the embodiment of FIG. 8.

After the three sectors X, X', X'' have been welded together to form the composite truncated cone shaped member, a cylindrical trunnion 64 is welded by any suitable welding method to the outer face of the truncated cone.

The cylindrical trunnion is rolled by well-known rolling techniques from an intially flat plate of rolled steel into a hollow cylindrical shape, with the two opposite meeting edges being axially welded to each other by any suitable welding method.

Figure 9:
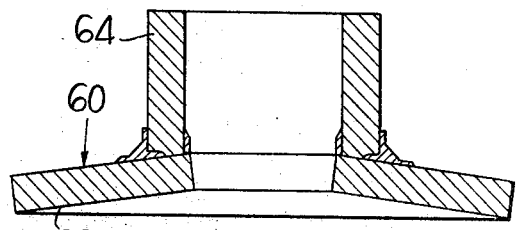
FIG. 9 is a view in section showing the welded connection of the trunnion to the fabricated conical mill head.

A truncated cone-shaped mill head and attached trunnion as shown in FIG. 9 may be attached to each of the opposite ends of a cylindrical mill shell to constitute the shell, heads, and trunnions of a grinding mill. The outer terminus 66 of the truncated conical body opposite the truncated end is adapted to be connected to the hollow cylindrical shell of a grinding mill or the like.

From the foregoing detailed description of the present invention, it has been shown how the objects of the invention have been attained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. The method of forming a truncated conical sector which is subsequently joined to other similar sectors to form a truncated conical body such as a head for a grinding mill or the like, which comprises the steps of (1) cutting from a flat plate of rolled steel a piece including thereon the developed shape of said sector; (2) positioning said piece between a first bending means and a second bending means with one of said bending means being inclined relative to the other of said bending means at an angle required to provide the desired predetermined cone angle of said truncated conical head; said first and second bending means being effective to bend only a portion of the total area of said piece in a single bending operation; (3) mounting said piece for movement about a pivot located at the projected apex of the truncated cone of which said conical sector forms a part; (4) moving said piece about said pivot successively to each of a plurality of bending positions; and (5) relatively moving said first and said second bending means toward each other to bend said piece at each successive bending position.

2. The method defined in claim 1 in which said first bending means is a first roll member and said second bending means is a pair of parallel roll members, and said second bending means is inclined relative to said first bending means.

3. The method defind in claim 6 in which said first roll member lies in a horizontal plane about a fixed axis, and said pair of roll members lie in a common plane inclined to the horizontal about axes whose inclination to the horizontal is adjustable.

4. The method defined in claim 1 in which said piece is bent by said first and second bending means along a plurality of bend lines each of which radiates from the projected apex of the truncated cone of which the sector forms a part.

5. The method defined in claim 1 in which said piece includes an inner periphery at the truncated region of the piece and an outer periphery, said inner periphery and said outer periphery each lying on a respective arc whose center is the apex of the truncated cone of which the sector forms a part.

6. The method defined in claim 1 which includes the step of rigidly attaching an arm member to said piece, and mounting said arm member for movement about the projected apex of the truncated cone of which said conical sector forms a part.

7. The method defined in claim 1 which includes the step of rigidly attaching an arm member to said piece, and mounting said arm member by a ball-and-cylinder connection for movement about the projected apex of the truncated cone of which said conical sector forms a part.

References Cited

UNITED STATES PATENTS

| 2,759,514 | 8/1956 | Knost | 72—133 |
| 3,091,279 | 5/1963 | O'Neill | 72—171 |

CHARLES W. LANHAM, Primary Examiner

R. M. ROGERS, Assistant Examiner

U.S. Cl. X.R.

72—212, 379, 389